United States Patent [19]

Gasan et al.

[11] Patent Number: 4,987,800
[45] Date of Patent: Jan. 29, 1991

[54] CUTTER ELEMENTS FOR ROTARY DRILL BITS

[75] Inventors: Joseph A. Gasan, Stroud; Malcolm R. Taylor, Gloucester; Phillip Bex, Camberley, all of England

[73] Assignee: Reed Tool Company Limited, Gloucestershire, England

[21] Appl. No.: 371,711

[22] Filed: Jun. 26, 1989

[30] Foreign Application Priority Data

Jun. 28, 1988 [GB] United Kingdom ............... 8815333
Apr. 28, 1989 [GB] United Kingdom ............... 8909875

[51] Int. Cl.⁵ .......................... B21K 5/02; E21B 10/46
[52] U.S. Cl. .............................. 76/108.2; 76/DIG. 12; 51/293; 175/329; 175/410
[58] Field of Search ............ 76/108 A, 108 R, 101 R, 76/101 E, DIG. 12; 175/329, 410; 51/293, 295

[56] References Cited

U.S. PATENT DOCUMENTS

Re. 32,036 11/1985 Dennis ................................ 175/329
4,702,649 10/1987 Komanduri ......................... 51/293
4,792,001 12/1988 Zijsling ............................... 175/410

Primary Examiner—Roscoe V. Parker
Attorney, Agent, or Firm—Browning, Bushman, Anderson & Brookhart

[57] ABSTRACT

A preform cutting element, for a rotary drill bit, includes a layer of polycrystalline diamond material having a front cutting face, a rear face and a peripheral surface, a cutting edge being provided by at least part of the junction between the front cutting face and the peripheral surface. The diamond layer is formed around its periphery, adjacent the cutting edge, with a row of spaced apertures. Each aperture is in the form of a bore, formed for example by a laser, which is inclined at 45° to the cutting face and extends completely through the diamond layer from the cutting face to the peripheral surface thereof. The apertures serve to inhibit the propagation of spalling across the cutting face from the cutting edge.

21 Claims, 2 Drawing Sheets

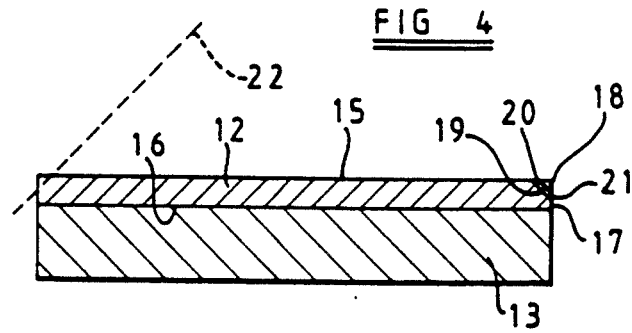
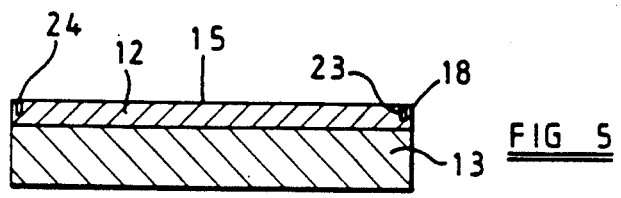
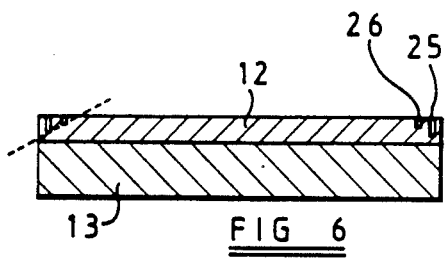
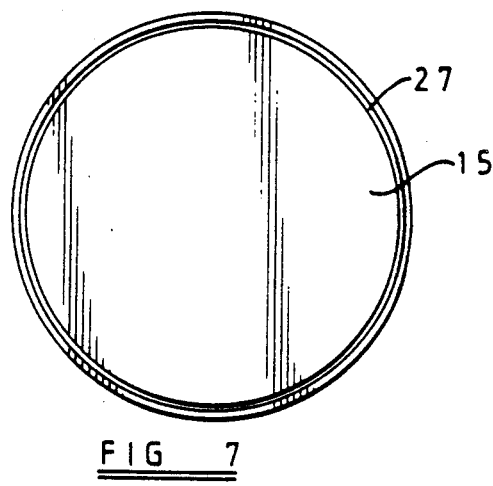
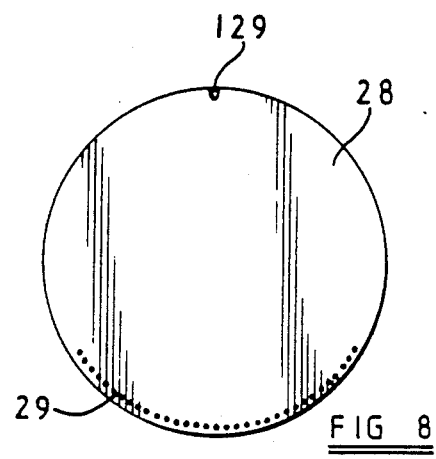

CUTTER ELEMENTS FOR ROTARY DRILL BITS

BACKGROUND OF THE INVENTION

The invention relates to cutting elements for rotary drill bits for use in drilling or coring holes in subsurface formations.

In particular, the invention is applicable to cutting elements for use on rotary drill bits of the kind comprising a bit body having a shank for connection to a drill string and an inner passage for supplying drilling fluid to the face of the bit, the bit body carrying a plurality of cutting elements. Each cutting element comprises a preform element, often in the form of a circular disc, including a layer of superhard material having a front cutting face, a rear face and a peripheral surface, a cutting edge being provided by at least part of the junction between the front cutting face and the peripheral surface.

Usually each preform cutting element comprises two layers: a hard facing layer formed of polycrystalline diamond or other superhard material, and a backing layer formed of less hard material, usually cemented tungsten carbide, the two layers being bonded together during formation of the cutting element in a high pressure, high temperature forming press. However, the invention is also applicable to preform cutting elements of the kind comprising a single layer of polycrystalline diamond. Such single-layer preforms may be thermally stable at higher temperatures than two-layer preforms and are therefore commonly referred to as thermally stable preforms.

In either case the preform may be directly mounted on the bit body or may be bonded to a carrier, for example also of cemented tungsten carbide, the carrier being in turn received in a socket in the bit body. The bit body may be machined from metal, usually steel, or may be formed from an infiltrated tungsten carbide matrix by a powder metallurgy process.

Such cutting elements are subjected to extremes of temperature and heavy loads, including impact loads, when the drill is in use down a bore hole. It is found that under drilling conditions spalling of the diamond layer can occur, that is to say the separation and loss of diamond material over the cutting surface of the layer. Such spalling usually spreads from the cutting edge, probably as a result of impact forces. The spalling reduces the cutting efficiency of the element. In severe cases the spalling can lead to delamination, that is to say separation of the diamond layer from the backing layer in the case of a two-layer preform, or separation of the cutting element from the bit surface or carrier to which it is bonded in the case of a single layer thermally stable cutting element.

It has been found that the incidence of spalling can be reduced by bevelling the periphery of the layer of superhard material. Reference in this regard may be made to U.S. Pat. No. Re. 32036. However, the bevelling process is comparatively costly and time consuming, involving as it does the cutting or grinding of a significant amount of the superhard material from the periphery of the layer. Also, bevelling of the edge reduces the sharpness, and hence the cutting efficiency of the cutting edge. The present invention sets out to provide an alternative and advantageous method of treating the layer of superhard material in a cutting element to inhibit spalling.

SUMMARY OF THE INVENTION

According to the invention there is provided a preform cutting element including a layer of superhard material having a front cutting face, a rear face and a peripheral surface, a cutting edge being provided by at least part of the junction between the front cutting face and the peripheral surface, the layer being formed with a plurality of spaced apertures each of which extends at least partly into the layer of superhard material from an opening in the cutting face thereof, which openings are adjacent the cutting edge.

As a result of the presence of the apertures adjacent the cutting edge, any spalling originating from the cutting edge is prevented from spreading across a substantial part of the cutting face, since the flaking off of the diamond material ceases when the opening in the cutting face is reached. The drilling of apertures in the diamond layer may be quicker and cheaper than the process necessary to produce a bevelled edge. Furthermore, the cutting edge on the new element, being unbevelled, is sharper and provides greater cutting efficiency so long as spalling does not occur, and thus the edge sharpness may be maintained for a considerable time, particularly when drilling in comparatively soft formations.

Each aperture may be in the form of a bore extending at least partly through the layer of superhard material from said opening in the cutting face, which opening is spaced inwardly from the cutting edge. Each bore is preferably of substantially circular cross section.

Each bore may be inclined outwardly, for example at 45°, towards the peripheral surface of the layer of superhard material as it extends into said material from said front cutting face, and preferably extends completely through the superhard material so as to intersect the peripheral surface of said material.

Said openings are preferably spaced inwardly from the cutting edge by substantially equal distances, and are substantially equally spaced apart in a row along said cutting edge.

In an alternative embodiment according to the invention each bore may extend substantially at right angles to the cutting face of the layer. Each bore may extend only partly through the thickness of the layer of superhard material.

In any of the above arrangements there may be provided at least one further row of openings, from which bores extend at least partly into the layer of superhard material, spaced inwardly of the first said row of openings.

The invention also includes within its scope a preform cutting element including a layer of superhard material having a front cutting face, a rear face and a peripheral surface, a cutting edge being provided by at least part of the junction between the front cutting face and the peripheral surface, the layer being formed with an elongate slot extending into the layer of superhard material from a correspondingly elongate opening in the cutting face, said opening extending along at least part of the cutting edge and being spaced inwardly therefrom.

There may be provided at least one further elongate opening, from which an elongate slot extends at least partly into the layer of superhard material, said further opening being spaced inwardly of the first said elongate opening.

In any of the above arrangements where two or more rows of apertures, or elongate slots, are provided at different distances from the cutting edge, the apertures or slot further from the cutting edge preferably extend into the superhard material to a lesser depth than the apertures or slot nearer the cutting edge.

In any of the above arrangements the cutting element may be a two-layer preform comprising a hard facing layer formed of polycrystalline diamond or other superhard material bonded to a backing layer of less hard material. Alternatively the cutting element may comprise a single layer of thermally stable polycrystalline diamond.

Where the cutting element is in the form of a circular disc, said apertures or slot may extend around substantially the whole periphery of the disc. In the case where said apertures or slot extend around only a portion of the periphery of the cutting element, the element is preferably formed with indicating means in a predetermined position in relation to the position of the apertures or slot, to facilitate correct orientation of the element on the carrier or bit body on which it is to be mounted.

The invention also includes within its scope a method of forming a preform cutting element including a layer of superhard material having a front cutting face, a rear face and a peripheral surface, and a cutting edge provided by at least part of the junction between the front cutting face and the peripheral surface, the method including the step of forming in the layer a plurality of spaced apertures each of which extends at least partly into the layer of superhard material from an opening in the cutting face thereof, which openings are adjacent the cutting edge.

Each aperture may be in the form of a bore which is inclined to the cutting face and extends completely through the superhard material from the cutting face to the peripheral surface thereof. The bore may be conveniently be formed by a laser.

BRIEF DESCRIPTION OF THE DRAWINGS

FIG. 4 is a section through the cutting element of FIGS. 2 and 3 showing the formation of the apertures, FIG. 5 is a section through an alternative form of cutting element in accordance with the invention, FIG. 6 is a similar section through a further form of cutting element and, FIGS. 7 and 8 are front views of still further forms of cutting elements.

DETAILED DESCRIPTION OF THE PREFERRED EMBODIMENTS

Figure 1:
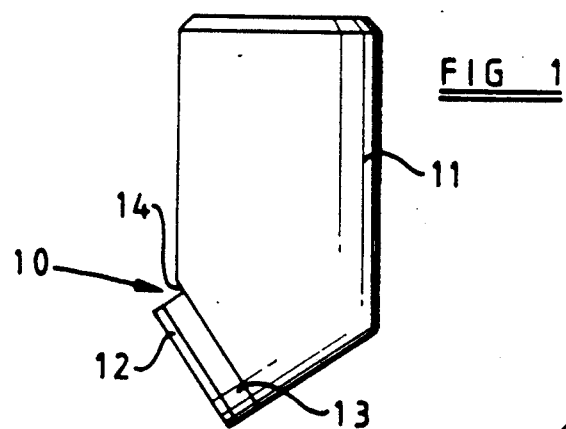
FIG. 1 is a side elevation of a typical form of cutting structure incorporating a cutting element of the kind to which the present invention may relate.

Referring to FIG. 1, there is shown a cutting structure comprising a two-layer preform cutting element 10, mounted on a carrier in the form of a stud 11 which, in use, is secured within a socket in the bit body.

The preform cutting element 10 is in the form of a circular tablet comprising a thin facing layer 12 of polycrystalline diamond (or other superhard material such as cubic boron nitride) bonded to a backing layer 13 of cemented tungsten carbide or other suitable material. Each layer is of uniform thickness. The rear surface of the backing layer 13 is brazed to an inclined surface 14 on the stud 11.

Many other forms of cutting structure incorporating preform cutting elements are possible. However, the design and construction of such structures are well known in the art and will not therefore be described in further detail.

Figure 2:
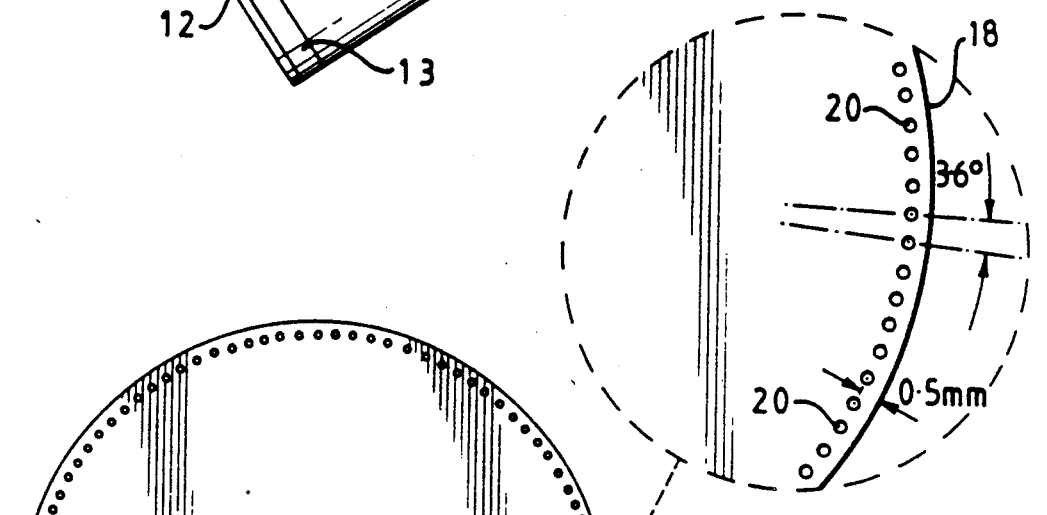
FIG. 2 is a front view of the cutting face of a cutting element in accordance with the invention, with a portion thereof shown enlarged.
Figure 2:
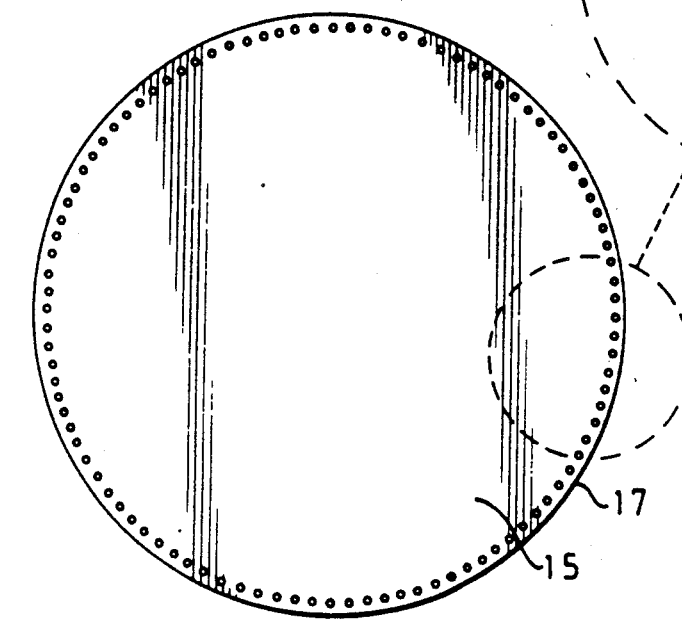
Figure 3:
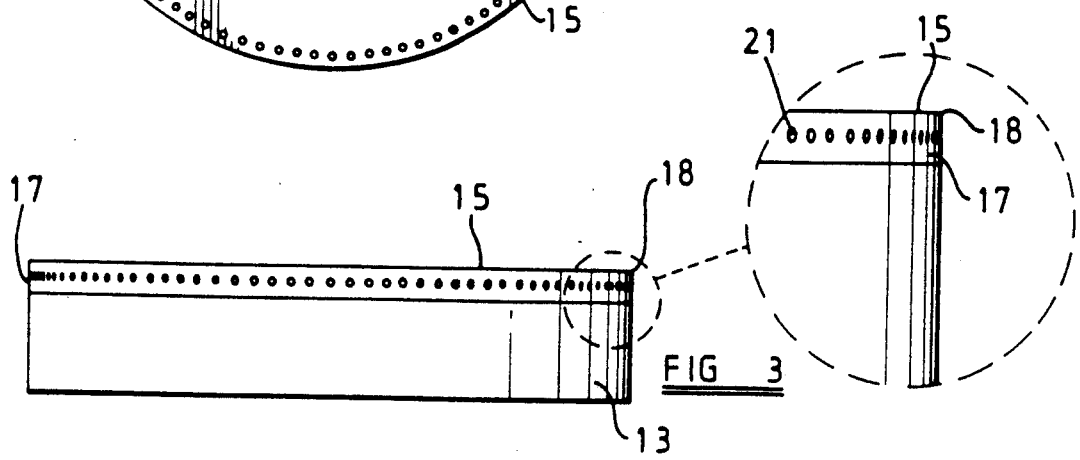
FIG. 3 is a side elevation of the cutting element of FIG. 2, with a portion thereof shown enlarged.

FIGS. 2-4 show on an enlarged scale, and in greater detail, a two-layer preform cutting element according to the invention. The diamond layer 12 has a front cutting face 15, a rear face 16 bonded to the tungsten carbide backing layer 13, and a peripheral surface 17. The junction between the front cutting face 15 and the peripheral surface 17 provides a cutting edge 18.

The diamond layer 12 is formed with a plurality of apertures 19 each of which is in the form of an inclined bore which extends at substantially 45° from an opening 20 in the front cutting face 15 to an opening 21 in the peripheral surface 17 of the diamond layer. As best seen in FIGS. 2 and 3, the apertures 19 are closely and equally spaced around the entire periphery of the cutting element. The apertures may, for example, be spaced by a distance of approximately 0.5 mm from the cutting edge 18 and angularly spaced apart by 3.6° with respect to the centre of the cutting element, as shown in FIG. 2.

The bores 19 may be of substantially circular cross section and may be formed by any suitable method. For example, the bores may be formed by a laser beam 22 as indicated diagrammatically in FIG. 4. The laser beam is suitably positioned and oriented so that when the laser is fired the required bore is formed at 45° (or other suitable engine) in the diamond layer as shown. The cutting element may be mounted for rotation about its central axis and rotationally indexed through 3.6° between each firing of the laser until all the required apertures have been formed. Due to the nature of the laser boring operation, the diameter of each bore 19 will tend to taper inwardly as it extends from the opening 20 in the front cutting face 15 to the opening 21 in the peripheral surface 17 of the diamond layer.

Each bore might also be formed by a mechanical drilling operation or by electron discharge machining. Such methods are well known in the art and will not be described in detail. The bores might also be formed by including in the diamond layer, during its formation, inclined inserts of erodable material in the positions where the bores are required to be, the erodable material subsequently being removed, for example by a chemical etching process.

When a cutting element of the kind described is in use on a drill bit, if there is any tendency for spalling of the diamond layer to occur, the flaking of the surface of the diamond layer 12 will tend to spread across the cutting face 15 from the cutting edge 18. However, the presence of the inclined bores 19 will intercept and limit the flaking, preventing its spreading across the face of the cutting element.

The inclination of the bores 19, as shown in FIG. 4, is preferred since it allows the bores to be drilled by use of a laser passing completely through the material of the diamond layer. However, if a method of forming the bores is used which allows the depth of each bore to be controlled, for example if the bores are mechanically drilled, then alternative arrangements are possible and one such arrangement is shown in FIG. 5.

In the arrangement of FIG. 5, the circular bores 23 are drilled at right angles to the cutting face 15 and extend only part way through the thickness of the diamond layer 12. Each bore 23 extends from a circular opening 24 in the front cutting face. The openings 24 are spaced apart and inwardly of the cutting edge 18 in similar fashion to the arrangement of the openings 20 in FIG. 2. Again, in this arrangement, the presence of the bores 23 will intercept and limit any flaking of the front surface 15 of the diamond layer as it spreads across the face of the cutting element from the cutting edge 18.

The cutting element may be formed with two or more concentric rows of bores 25 and 26, as shown in FIG. 6, the outer bores 25 being drilled to a greater depth than the inner bores 26.

Instead of the apertures in the diamond layer 12 being formed as separate bores spaced apart side by side around the periphery of the cutting element, there may be provided a single elongate slot extending around the whole periphery of the cutting element as indicated at 27 in FIG. 7. The slot 27 will, when viewed in section, show a similar configuration to FIG. 5. Two concentric slots of different depths may be employed such slots, when viewed in section, showing a similar configuration to FIG. 6.

Although the bores 19, 23, 25 and 26 are shown as extending at 45° or 90° to the cutting face 15 of the cutting element, it will be appreciated that they may be inclined at other angles thereto.

When a cutting element is mounted on a drill bit only a portion of the cutting element 18 engages the formation being drilled and is thus liable to initiate spalling. Accordingly, it may not be necessary to provide apertures around the whole periphery of the cutting element, but only around that part of the periphery which, in use, will engage the formation being drilled. FIG. 8 shows a cutting element of this kind.

In the arrangement of FIG. 8 a plurality of inclined bores, corresponding to the bores 19 of FIGS. 2-4, are formed around approximately one third of the periphery of the circular cutting element 28, the bores leading from openings 29 in the front cutting face of the cutting element.

Cutting elements of the kind first described, in which apertures are formed around the whole periphery of the element, have the advantage that the cutting element can be mounted on the bit body in any rotational orientation. A cutting element of the kind shown in FIG. 8, however, must be mounted in such an orientation that the portion of the cutting edge which engages the formation is that portion adjacent the row of openings 29. When mounting such a cutting element on a stud, for example, it may be necessary to employ a jig which obscures the position of the apertures so that the orientation of the cutting element cannot be readily seen when the element is positioned in the jig ready for brazing to the stud. Accordingly, in a cutting element of this kind it may be desirable to form the cutting element with an indicator which is fixed in relation to the position of the apertures and which may thus serve as a guide for placing the cutting element in the correct orientation. For example, in the cutting element of FIG. 8 the peripheral surface of the cutting element at a position diametrically opposite the centre of the row of openings 29 is formed with an axial groove 129 which can be seen when viewing the cutting element from its periphery of from the rear. The groove indicator 129 may thus be lined up with a corresponding indicator on the stud or jig which is positioned so that the cutting element will be in the required orientation.

The cutting elements described have all been in the form of circular tablets, but it will be appreciated that the invention is equally applicable to cutting elements of other shapes, such as elements which are semi-circular or otherwise cut from a larger circular blank.

Although the invention is described above in relation to two-layer preforms, the invention is also applicable to preforms comprising a single thermally stable polycrystalline diamond layer, in which case the single layer is mounted directly on the bit body or on a carrier such as the stud.

Instead of the apertures in the diamond layer being in the form of spaced bores or elongate slots, as described above, such apertures may be in the form of spaced radial cuts or slots which extend inwardly a short distance from the cutting edge. The bottoms of such cuts or slots may be inclined downwardly, for example at 45°, as they extend from the front face 15 to the peripheral face 17 of the diamond layer 12.

We claim:

1. A preform cutting element including a layer of superhard material having a front cutting face, a rear face, a peripheral surface, and a cutting edge provided by at least part of the junction between the front cutting face and the peripheral surface, the layer being formed with a plurality of spaced apertures each of which extends at least partly into the layer of superhard material from an opening in the cutting face thereof, which openings are adjacent the cutting edge.

2. A cutting element according to claim 1, wherein each aperture is in the form of a bore extending at least partly through the layer of superhard material from said opening in the cutting face, which opening is spaced inwardly from the cutting edge.

3. A cutting element according to claim 2, wherein each bore is substantially circular cross section.

4. A cutting element according to claim 2, wherein each bore is inclined outwardly towards the peripheral surface of the layer of superhard material as it extends into said material from said front cutting face.

5. A cutting element according to claim 4, wherein each inclined bore extends completely through the superhard material and intersects the peripheral surface of said material.

6. A cutting element according to claim 4, wherein each inclined bore is inclined at substantially 45° to said front cutting face.

7. A cutting element according to claim 2, wherein said openings are spaced inwardly from the cutting edge by substantially equal distances.

8. A cutting element according to claim 1, wherein said apertures are substantially equally spaced apart in a row along said cutting edge.

9. A cutting element according to claim 1, wherein each bore extends substantially at right angles to the cutting face of the layer.

10. A cutting element according to claim 1, wherein each bore extends only partly through the thickness of the layer of superhard material.

11. A cutting element according to claim 8, wherein there is provided at least one further row of openings, from which bores extend at least partly into the layer of superhard material, spaced inwardly of the first said row of openings.

12. A cutting element according to claim 1, wherein two rows of apertures are provided at different distances from the cutting edge, and wherein the apertures further from the cutting edge extend into the superhard material to a lesser depth than the apertures nearer the cutting edge.

13. A cutting element according to claim 1, wherein the cutting element is a two-layer preform comprising a hard facing layer formed of polycrystalline diamond or other superhard material bonded to a backing layer of less hard material.

14. A cutting element according to claim 1, wherein the cutting element comprises a single layer of thermally stable polycrystalline diamond.

15. A cutting element according to claim 1, wherein the cutting element is in the form of a circular disc, said apertures extending around substantially the whole periphery of the disc.

16. A cutting element according to claim 1, wherein said apertures extend around only a portion of the periphery of the cutting element, the element being formed with indicating means in a predetermined position in relation to the position of the apertures.

17. A preform cutting element including a layer of superhard material having a front cutting face, a rear face, a peripheral surface, and a cutting edge provided by at least part of the junction between the front cutting face and the peripheral surface, the layer being formed with an open elongate slot extending into the layer of superhard material from a correspondingly elongate opening in the cutting face, said opening extending along at least part of the cutting edge and being spaced inwardly therefrom.

18. A preform cutting element including a layer of superhard material having a front cutting face, a rear face, a peripheral surface, and a cutting edge provided by at least part of the junction between the front cutting face and the peripheral surface, the layer being formed with an elongate slot extending into the layer of superhard material from a correspondingly elongate opening in the cutting face, said opening extending along at least part of the cutting edge and being spaced inwardly therefrom, and at least one further elongate opening, from which an elongate slot extends at least partly into the layer of superhard material, said further opening being spaced inwardly of the first said elongate opening.

19. A method of forming a preform cutting element including a layer of superhard material having a front cutting face, a rear face, a peripheral surface, and a cutting edge provided by at least part of the junction between the front cutting face and the peripheral surface, the method including the step of forming in the layer a plurality of spaced apertures each of which extends at least partly into the layer of superhard material from an opening in the cutting face thereof, which openings are adjacent the cutting edge.

20. A method according to claim 19, wherein each aperture is in the form of a bore which is inclined to the cutting face and extends completely through the superhard material from the cutting face to the peripheral surface thereof.

21. A method according to claim 20, wherein each bore is formed by a laser.

* * * * *